(12) United States Patent
Shver (10) Patent No.: US 7,704,444 B2
(45) Date of Patent: *Apr. 27, 2010

(54) METHOD AND APPARATUS FOR TESTING CHARACTERISTICS OF A FURNACE MELT

(75) Inventor: Valery G. Shver, Alpharetta, GA (US)

(73) Assignee: Process Technology International, Inc., Tucker, GA (US)

( * ) Notice: Subject to any disclaimer, the term of this patent is extended or adjusted under 35 U.S.C. 154(b) by 693 days.

This patent is subject to a terminal disclaimer.

(21) Appl. No.: 11/170,254

(22) Filed: Jun. 29, 2005

(65) Prior Publication Data

US 2007/0001352 A1   Jan. 4, 2007

(51) Int. Cl.
*F27D 3/14* (2006.01)
*C21B 7/16* (2006.01)
*C21C 7/72* (2006.01)

(52) U.S. Cl. .......................... 266/216; 266/47; 266/217; 266/218; 266/225; 266/226; 266/265; 266/270; 75/10.39; 75/10.4; 75/10.46; 75/10.52; 373/75; 373/76; 373/79

(58) Field of Classification Search ............ 266/47, 266/216–218, 225–226, 265, 270; 75/10.39, 75/10.4, 10.46, 10.52; 373/75–76, 79
See application file for complete search history.

(56) References Cited

U.S. PATENT DOCUMENTS

| | | | |
|---|---|---|---|
| 2,821,378 A | * | 1/1958 | Tama .......................... 266/236 |
| 3,752,895 A | * | 8/1973 | Clishem et al. ............... 373/85 |
| 4,077,614 A | | 3/1978 | Udo et al. |
| 4,392,637 A | | 7/1983 | Weber et al. |
| 4,653,730 A | | 3/1987 | Wunsche et al. |

(Continued)

FOREIGN PATENT DOCUMENTS

DE    3419769    * 1/1985
SU     741030    * 6/1980

OTHER PUBLICATIONS

Korean Intellectual Property Office International Search Report for PCT Application No. PCT/US2007/017543 dated Dec. 18, 2007.

(Continued)

*Primary Examiner*—Roy King
*Assistant Examiner*—Lois Zheng
(74) *Attorney, Agent, or Firm*—Troutman Sanders LLP; James E. Schutz (57) ABSTRACT

A method and apparatus for testing characteristics of a furnace melt are provided. Preferably, the method and apparatus provide for the safe and efficient testing of metal temperature and composition of molten metal during the melt cycle of the metal. According to one aspect of the invention used in a steel making process in an electric arc furnace, a furnace probe is reciprocated through a furnace probe plug aperture, the furnace probe is retracted from the furnace probe plug aperture, a furnace probe is inserted through the furnace probe plug aperture, the furnace probe is retracted from the aperture, and the furnace probe aperture plug is inserted into the furnace probe plug aperture.

34 Claims, 4 Drawing Sheets

U.S. PATENT DOCUMENTS

| | | | |
|---|---|---|---|
| 4,993,689 A * | 2/1991 | von Bogdandy et al. ...... 266/79 |
| 5,069,553 A | 12/1991 | Phillippi |
| 5,410,566 A | 4/1995 | Steins et al. |
| 5,956,365 A | 9/1999 | Haissig |
| 6,004,504 A | 12/1999 | Vallomy |
| 6,171,364 B1 | 1/2001 | Sarma et al. |
| 6,212,218 B1 * | 4/2001 | Shver ............... 373/72 |
| 6,289,035 B1 | 9/2001 | Shver |
| 6,471,911 B1 | 10/2002 | Pleschiutschnigg et al. |
| 6,614,831 B2 | 9/2003 | Shver |
| 6,749,661 B2 | 6/2004 | Shver |
| 6,805,724 B2 | 10/2004 | Shver |
| 2005/0005735 A1 | 1/2005 | Shver |

OTHER PUBLICATIONS

Jones, Jeremy A.T., "Electric Arc Furnace Steelmaking," American Iron and Steel Institute Steel Works, Learning Center, http://www.steel.org/learning/howmade/eaf.htm, pp. 1-17, Mar. 30, 2005.

More Srl, Nucor Steel Decatur Trinity Alabama U.S.A., "Temperature Automatic Measure in the Liquid Steel Bath," Installation, Use & Maintenance Manual Book, Gemona del Friuli, Italy, Oct. 2004, pp. 1-34.

CMP E.A.F.—Multifunction Car, Via ell Industria—Zona Industriale S. Andrea, Italy.

Haissig, Manfred, Enhancement of EAF Performance by Injection Technology, The Environment Within a Symposium on Iron and Steelmaking, McMaster University, Hamilton, Ontario, Canada, May 24-26, 1994.

U.S. International Serach Report and Written Opinion for PCT/US2006/025035 dated Dec. 4, 2006.

* cited by examiner

METHOD AND APPARATUS FOR TESTING CHARACTERISTICS OF A FURNACE MELT

TECHNICAL FIELD

The present invention relates generally to a method and apparatus used in metal melting, refining and processing, and more particularly, a method and apparatus for testing the characteristics of molten metal in a furnace melt.

BACKGROUND

Electric arc furnaces (EAFs) make steel by using an electric arc to melt one or more charges of scrap metal, hot metal, iron based materials, or other meltable materials, which is placed within the furnace. Modern EAFs may also make steel by melting DRI (direct reduced iron) combined with the hot metal from a blast furnace. In addition to the electrical energy of the arc, chemical energy is provided by auxiliary burners using fuel and an oxidizing gas to produce combustion products with a high heat content to assist the arc.

If the EAF is used as a scrap melter, the scrap burden is charged by dumping it into the furnace through the roof opening from buckets, which also may include charged carbon and slag forming materials. A similar charging method using a ladle for the hot metal from a blast furnace may be used along with injection of the DRI by a lance to produce the burden. Additionally, these materials could be added through other openings in the furnace.

In the melting phase, the electric arc and burners melt the burden into a molten pool of metal, termed an iron carbon melt, which accumulates at the bottom or hearth of the furnace. Typically, after a flat bath has been formed by melting of all introduced burden, the electric arc furnace enters a refining and/or decarburization phase. In this phase, the metal continues to be heated by the arc until the slag forming materials combine with impurities in the iron carbon melt and rise to the surface as slag. During the heating of the iron carbon melt, it reaches the temperature and conditions when carbon in the melt combines with oxygen present in the bath to form carbon monoxide bubbles. Generally, flows of oxygen are blown into the bath with either lances or burner/lances to produce a decarburization of the bath by the oxidation of the carbon contained in the bath.

The resulting decarburization reduces the carbon content of the bath to a selected level. If an iron carbon melt is under 2% carbon it becomes steel. Except for operations using the hot metal from the Blast furnaces, the EAF steel making processes typically begin with burdens having less than 1% carbon. The carbon in the steel bath is continually reduced until it reaches the content desired for producing a specific grade of steel, down to less than 0.1% for low carbon steels.

Once the steel bath reaches a desired temperature and grade, it can be removed from the furnace. With the imperative to decrease steel production times in electric arc furnaces, it is desirable to identify when the steel is ready for removal as soon as it reaches the desired temperature and conditions. Unfortunately, there are several challenges that must be surmounted to determine whether the melt is ready for tapping.

A furnace must reach very high temperatures to melt burden into molten metal. For example, scrap steel melts at approximately 2768° F. To achieve such high temperatures, steel making furnaces are generally fully enclosed with a minimal number of openings. Due to the negative pressures in the EAF, furnace openings may allow ambient air into the furnace and create a cold spots. Additionally, it is typically desirable to raise the temperature of the melt sufficiently above the melting point (typically to 2950° F.-3050° F.) to allow the melt to be transferred from the furnace to a desired location and further processed without prematurely solidifying.

Additionally, due to the high temperature, it is not practical to install a permanent temperature gauge in the furnace to monitor the temperature of the molten metal bath. Accordingly, steel makers typically use disposable thermocouples to check the liquid bath temperature. Disposable probes are typically mounted in cardboard sleeves that slide onto a steel probe pole, which has internal electrical contracts. The disposable probe transmits an electrical signal to the steel pole, which in turn transmits the signal to an electronic unit for interpretation. Additional probes may be used to determine the carbon content and dissolved oxygen levels in the molten metal. Various disposable temperature and chemical content probes are known in the art.

Typically, disposable probes are inserted into the furnace through the slag door. Unfortunately, there are several drawbacks to measuring the temperature through the open slag door. For example, when the door is open, a large amount of heat can escape the furnace. If the molten metal bath is at this moment below the desired temperature, the several temperature probes may have to be made in which case the furnace must compensate for the heat lost during this process by consuming more energy.

Another draw back to measuring steel bath parameters through the slag door involves the process of inserting a probe into the liquid bath. Many years ago, probes were only introduced into the melt manually. This manual operation puts the operator at great risk of injury. Today, some steel plants and foundries still use this manual procedure because most alternative systems are very costly. Each year, operators are seriously injured or even killed while taking furnace measurements manually. These injuries typically occur when slag volume increases quickly in the furnace and overflows, thereby causing injury to the operator.

Slag overflow is typically caused by rapid reaction of oxygen and carbon in the furnace. Oxygen is injected into the steel bath to remove or balance the elements such as, but not limited to, sulphur, phosphorus, manganese, silicon and carbon. Although carbon reacts quickly with oxygen, as the carbon concentration in the steel bath decreases below 0.10% by weight, the oxygen-carbon reaction slows down considerably. In order to reduce carbon below 0.05% in the steel bath, the active or free oxygen level in the steel must be about 500 ppm. If any material such as slag or scrap were to fall from the walls of the furnace into the steel bath, an eruption will occur. The oxidizable elements in the slag or steel will react with the active oxygen in the steel bath and create, very quickly, a large amount of combustible gasses. These gases can erupt with enough force to throw slag and steel a great distance. In addition, when the combustible gases created in this reaction are exiting the furnace through the slag door, they rapidly combust with the air outside of the furnace thus increasing the intensity of the reaction.

Such reactions occur so quickly that it creates an explosive effect. Tragically, if such reactions occur while the slag door is open for a manual measurement, the slag boil can overflow the furnace and cause great harm to the operator. Now, many furnace operators use a large, and expensive, mobile device for inserting probes into the furnace. Since the slag door must remain clear for removing slag from the furnace, a dedicated temperature probe insertion tool can not be installed adjacent to the slag door. Rather, the device must either have a very long arm to reach through the slag door to the bath, or it must be mobile so that it can be moved out of the way of the door for other processes.

When the slag door is opened, any slag and metal trapped at the door opening must be cleared to allow insertion of the measurement probe. Clearing the door can be done with a large ram that pushes the slag and scrap out of the door opening and into the melt. Since any scrap trapped in the opening is pushed into the melt adjacent to the door, a probe inserted through the door can not easily measure the temperature of the melt. It is a typical practice in the industry to wait for this scrap to be melted before taking a measurement. This practice adds additional time to the melting phase, and therefore additional expense, to the steel making process.

There are other potential options available for insertion of the temperature probe, but each has significant drawbacks and is not typically used in the industry. First, an opening could be provided in the side wall of the furnace and a temperature probe could be inserted through this opening. Unfortunately, there is not a good location for providing such opening. If the opening were provided low in the furnace, close to the melt, it would become clogged with slag. Thus, the slag would need to be removed prior to insertion of the probe. Prior to the present invention, there was not a device available for easily and efficiently cleaning slag from such an opening. Cleaning the slag from the hole is an onerous task because the slag solidifies on the walls of the furnace and can become quite thick. Thus, it would be difficult to clean the slag from the opening and insert the temperature probe in an efficient manner.

Alternatively, the opening could be provided very high on the side wall of the furnace where it would be less likely to become clogged with slag. This solution is also not desirable because the access opening would be far from the melt. Thus, an exceptionally long probe pole would be needed to reach down into the melt.

Therefore, it would be advantageous to provide a method and apparatus for measuring the temperature of a molten metal bath through an opening in the furnace, other than the slag door.

Additionally, it would be advantageous to provide a method and apparatus for measuring the temperature of a molten metal bath through a dedicated temperature probe aperture.

Additionally, it would be advantageous to provide a method and apparatus for removing slag from a dedicated temperature probe aperture.

Additionally, it would be advantageous to provide a method and apparatus for measuring molten metal bath characteristics through a dedicated probe aperture close to the bath.

Additionally, it would be advantageous to provide a method and apparatus for sampling a molten metal bath using a metallurgical probe to perform chemical analysis on the metal.

Additionally, it would be advantageous to provide a furnace with a dedicated probe aperture.

BRIEF SUMMARY OF THE INVENTION

The invention provides a method and apparatus for testing characteristics of molten metal in a furnace. Preferably, the method and apparatus provide the safe and efficient testing of the temperature and composition of molten metal during the melt cycle of the metal.

According to one aspect of the invention, a furnace probe plug is reciprocated through a furnace probe plug aperture, the furnace probe plug is retracted from the furnace probe plug aperture, a furnace probe is inserted through the furnace probe plug aperture, the furnace probe is retracted from the aperture, and the furnace probe aperture plug is inserted into the furnace probe plug aperture.

According to another aspect of the present invention, a furnace probe apparatus includes a mounting enclosure for protecting the furnace probe apparatus and mounting it in the furnace.

According to another aspect of the present invention, the furnace probe aperture plug may be reciprocated more than once during a metal melt cycle. Additionally, the furnace probe aperture plug may be reciprocated periodically during the metal melt cycle.

According to another aspect of the present invention, the furnace probe aperture plug is reciprocated to remove slag from the furnace probe aperture. Preferably, the reciprocation of the furnace probe aperture plug through the furnace probe plug aperture removes at least a portion of slag build up proximate the furnace probe aperture. Additionally, when the furnace probe aperture plug is reciprocated through the furnace probe aperture, it is extended through the aperture past the wall of the furnace probe enclosure and then retracted to its original closed position.

According to another aspect of the present invention, a furnace probe apparatus for use in an electric arc furnace comprises a furnace probe aperture plug adapted for insertion into a furnace probe aperture and a furnace probe aperture plug reciprocator for moving the furnace probe aperture plug. Preferably, the furnace probe aperture plug reciprocator is coupled to the furnace probe aperture plug and adapted to move the plug between a retracted position and an inserted position relative to the furnace probe aperture. When the furnace probe aperture plug is in an inserted position, it closes the furnace probe aperture and prevents slag and other debris from entering the furnace probe apparatus. When the furnace probe aperture plug is in a retracted position, it allows passage of a furnace probe through the furnace probe aperture.

According to another aspect of the present invention, the furnace probe aperture plug reciprocator is a telescoping arm adapted to advance and retract the furnace probe aperture plug.

According to another aspect of the present invention, the furnace probe apparatus mounting enclosure is fluid cooled and adapted to protect the furnace probe aperture plug and the furnace probe from the harsh environment of the furnace.

Accordingly to another aspect of the present invention, the furnace probe apparatus is mounted on the refractory step of the furnace and is accessed through a side wall panel of the furnace.

According to yet another aspect of the present invention, the mounting enclosure includes a deflector for deflecting scrap charged in the furnace away from the furnace probe and aperture plug. Preferably, the deflector is a porch sloped toward the inside of the furnace. Additionally, the mounting enclosure may include corrugations for retaining slag. The slag helps insulate the mounting device from the heat of the furnace.

These and other features as well as advantages, which characterize the various preferred embodiments of present invention, will be apparent from a reading of the following detailed description and a review of the associated drawings.

DETAILED DESCRIPTION OF PREFERRED EMBODIMENTS

Referring now the drawings, in which like numerals represent like elements, exemplary embodiments of the present invention are herein described.

Figure 1:
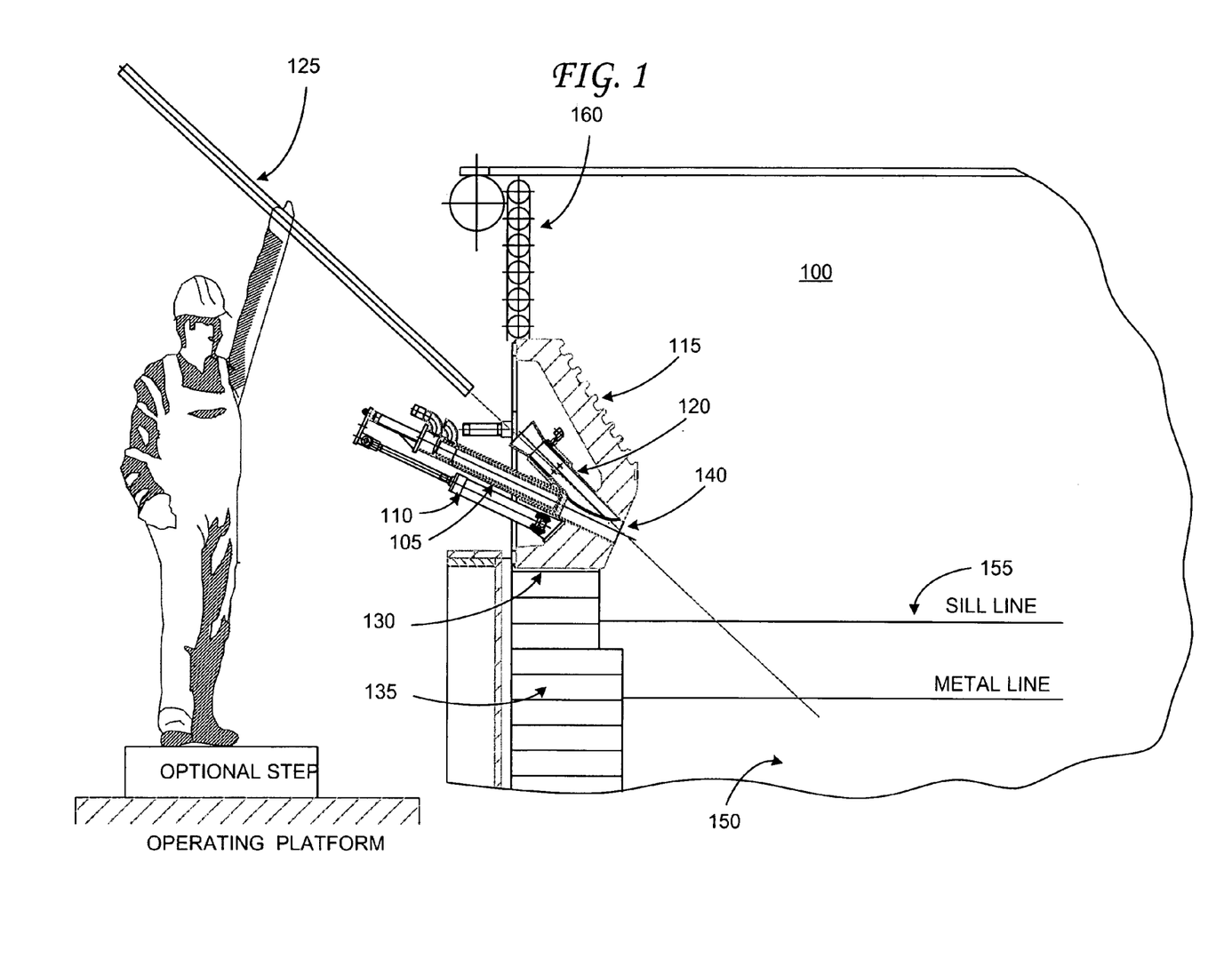
FIG. 1 is a cross-sectioned side view of an exemplary embodiment a furnace probe apparatus mounted in an electric arc furnace and which is constructed in accordance with an exemplary embodiment of the present invention.

FIG. 1 is a cross-sectioned side view of an exemplary embodiment a furnace probe apparatus mounted in an electric arc furnace ("EAF") and which is constructed in accordance with an exemplary embodiment of the invention. In an exemplary embodiment, the EAF 100 melts ferrous scrap, or other iron based materials, by means of an electric arc produced from one or more electrodes to collect a molten metal bath or melt 150 in its hearth. The metal bath level varies significantly during the melting process. The bath level generally begins with a hot heel level, which is the iron melt left from the previous heat. As multiple charges of scrap or other iron base materials are melted, the level rises. The furnace is typically filled to a level about 18 inches down from the sill line 155. Other steel making processes such as DRI melting and the ConSteel process produce similar bath level changes. Typically, the EAF hearth is generally spherical in shape and is made of refractory material able to withstand the high temperature of the molten metal. The hearth of the EAF 100 is typically surrounded by an upper shell comprised of a series of fluid cooled panels. It is known that the fluid cooled panels forming the side wall 160 of the furnace 100 can be of several conventional types. These panels are typically supplied with cooling fluid from circumferential supply conduits, which are connected to cause fluid to circulate through the panels and then exit to carry off heat.

Alternatively, spray cooled panels may be used in place of fluid cooled panels. In a typical spray cooled system, two concentric plate shells separated by a gap are used. Between the two shells are installed numerous spray nozzles that are adapted to spray the outside of the inner shell (the shell adjacent the interior of the furnace). The fluid sprayed onto the shell cools the shell material.

The melt 150, generally comprising iron and carbon, is generally covered with various amounts of slag, which is produced by the chemical reactions between the melt and slag forming materials added to the furnace before or during the melting process of the metal. Once the scrap metal or other burden has been melted, the metal bath 150 is generally refined by additives and decarburized by oxygen lancing. This produces the required chemistry for the melt and reduces the carbon content of the metal to the grade of steel desired.

After the electrodes are turned on, a foamy slag may be developed by injecting particulate carbon to protect the furnace components from radiation from the arc. During refining and thereafter, the metal bath 150 is typically heated by the electric arc above its melting temperature. The superheating is used to allow the metal bath 150 to remain at a high enough temperature while being transported in a ladle and while finishing other process steps. If the melt 150 does not contain an adequate carbon level for the grade of steel desired then it must be recarburized by adding carbon to the bath, or to the ladle, during or after tapping of the molten metal. The melt 150 may lack an adequate carbon level because of the materials which were melted to form the bath or because oxygen lancing has decreased the carbon content to below a desired threshold.

Prior to removing the melt 150 from the furnace 100, it is important to verify that the melt 150 has reached the appropriate temperature and has the desired characteristics. In an exemplary embodiment of the present invention, the temperature and chemical characteristics of the melt 150 are measured using a probe. Those of ordinary skill in the art will be familiar with various probes available for measuring temperature and chemical composition of the melt 150.

Figure 2:
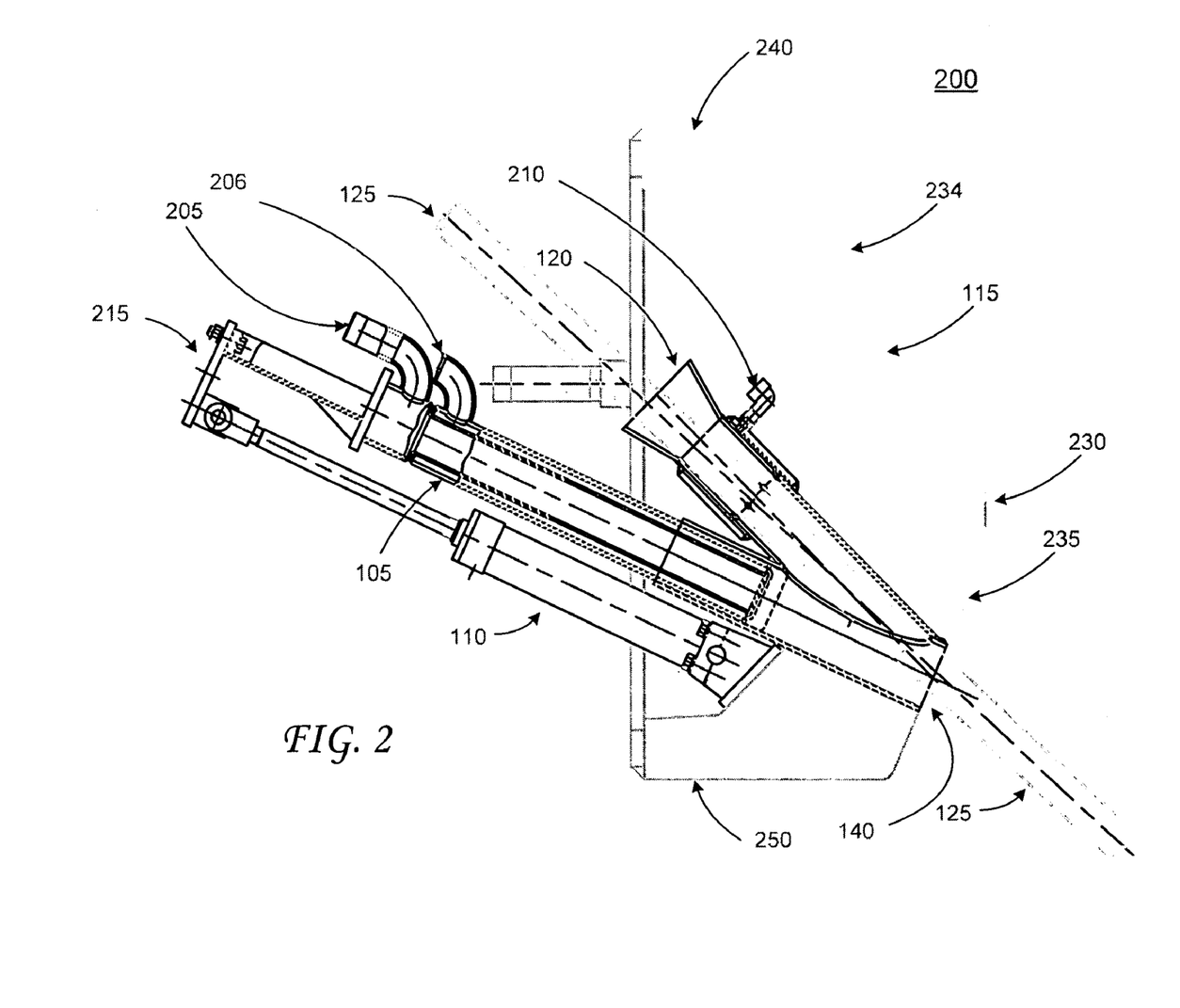
FIG. 2 is a cross-sectioned side view of the furnace probe apparatus illustrated in FIG. 1 showing the furnace probe aperture plug in a retracted position and a probe inserted through the furnace probe aperture.

FIG. 2 is a cross-sectioned side view of the furnace probe apparatus illustrated in FIG. 1, showing the probe aperture plug in a retracted position. As shown in FIG. 2, a furnace probe apparatus 200 in accordance with an exemplary embodiment of the present invention generally includes, but is not limited to, a furnace probe apparatus enclosure 115, a furnace probe plug 105, a furnace probe reciprocator 110, and a probe receptacle 120.

Referring back to FIG. 1, the furnace probe apparatus 200, is preferably mounted through an opening in the fluid cooling side wall panel 160 of the furnace 100. In the illustrated embodiment, the mounting enclosure 115 preferably rests on the step 130 formed between the panels of the side wall 160 of the upper shell of the furnace 100 and the refractory wall of the hearth 135. Alternatively, the furnace probe apparatus 200 could be supported or suspended from another suitable structural member of the furnace 100. In some embodiments, the furnace probe apparatus may be conveniently located near other furnace components used to introduce various constituents and/or additional chemical energy into the furnace, e.g., carbon injection lances, burners, and/or oxygen lances.

The furnace probe plug 105 and furnace probe receptacle 120 can be mounted in the furnace probe apparatus enclosure 115. The furnace probe apparatus enclosure 115 is preferably mounted low on the side wall 160 of the furnace or on the refractory step 130 to provide probe access close to the surface of the melt 150. The mounting enclosure 115 also provides protection for the furnace probe plug 105 and the furnace probe receptacle 120 from the intense heat of the furnace 100 and mechanical damage from falling scrap. In normal operation a slag covering forms on the mounting enclosure 115. The slag covering helps to insulate the mounting enclosure 115 from heat in the furnace.

The furnace probe receptacle 120 is typically slanted downward at a probing angle, preferably between 30-60 degrees, to direct the insertion of a probe 125 through the furnace probe aperture 140 toward the metal melt 150 in the hearth of the furnace 100. To promote measurements being taken easily from the side wall 160, it is preferable that the probe 125 is inserted at an angle which is neither too shallow nor too steep. If the angle is too steep, the probe may contact the hearth of the furnace 100 on the low end, yielding inaccurate measurements, or interfere with the sidewall fluid cooled elements in the upper shell on the high end. If the angle is too shallow, an exceptionally long probe may be required to reach into the melt 150. More preferably, an angle of approximately 45 degrees (+/−15 degrees) is used.

In an exemplary embodiment of the present invention, the furnace probe receptacle 120 is preferably cylindrical in shape with an enlarged, funnel shaped, opening for directing the furnace probe 125 through the furnace probe aperture 140.

Additionally, as shown in FIG. 2, the furnace probe receptacle may include a compressed air channel 210 for injecting compressed air through the furnace probe receptacle 120 and the furnace probe aperture 140. The compressed air can blow any slag or debris away from the furnace probe aperture 140 when the furnace probe aperture plug 105 is retracted. It is preferable to inject compressed air through the furnace probe aperture 140 whenever the furnace probe aperture plug 105 is in a retracted position.

In an alternative embodiment of the present invention, the furnace probe aperture plug may be omitted and a stream of compressed air can be continuously injected through the aperture to keep the opening free of slag and debris. Typically, this is not a desirable solution, due to the cost of continuously injecting compressed air and its cooling affect on the molten metal.

In an exemplary embodiment of the present invention, the furnace probe receptacle 120 includes a trigger for automatically injecting compressed air through the furnace probe aperture when the furnace probe aperture plug 105 is retracted. Additionally, the trigger may be adapted to automatically shut off the compressed air flow when the furnace probe aperture plug 105 is reinserted into the furnace probe aperture 140.

Referring back to FIG. 2, the furnace probe apparatus 200 is shown with the furnace probe plug 105 retracted away from the furnace probe aperture 140. In use, the furnace probe plug 105 is retracted to clear the furnace probe aperture 140 for insertion of a furnace probe 125. As is shown in FIG. 2, the furnace probe receptacle 120 directs a furnace probe 125 through the furnace probe aperture 140. Thus, the furnace probe 125, via the furnace probe receptacle 120, and the furnace probe receptacle plug 105 are inserted into the same aperture. FIG. 2 illustrates that the furnace probe 125 and the furnace probe receptacle 120 have intersecting paths. In order for the probe 125 to be inserted through the furnace probe aperture 140, the furnace probe aperture plug 105 is retracted sufficiently to allow passage of the probe 125. FIG. 2 illustrates this relationship as the furnace probe aperture plug 105 is retracted clear of the probe 125 path.

As shown in FIG. 2, an exemplary embodiment of the furnace probe enclosure 115 comprises a top fluid cooled panel 240, a front fluid cooled panel 230, and a bottom fluid cooled panel 250. Additionally, the front fluid cooled panel 230 may comprise an upper portion 234 that is sloped toward the center of the furnace and a lower portion 235 that is sloped inward toward the side of the furnace. Alternatively, the sloped portion 234 may be part of the top fluid cooled panel 240, or may be used in place of the top fluid cooled panel 240. Preferably, the upper portion 234 includes corrugations for trapping slag, thereby insulating the furnace probe enclosure 115 from the intense heat of the furnace. Preferably, the lower portion 235 is sloped inward at a wet angle. A wet angle is an angle at which fluid will adhere to the surface although gravity pulls the fluid away from the surface. Preferably, the wet angle is between 5 and 10 degrees from vertical. The inward slope of the lower portion 235 of the front wall 230 of the enclosure 115, allows the furnace probe aperture 140 to be protected from falling scrap by the upper portion 234 of the front surface 230.

Figure 3:
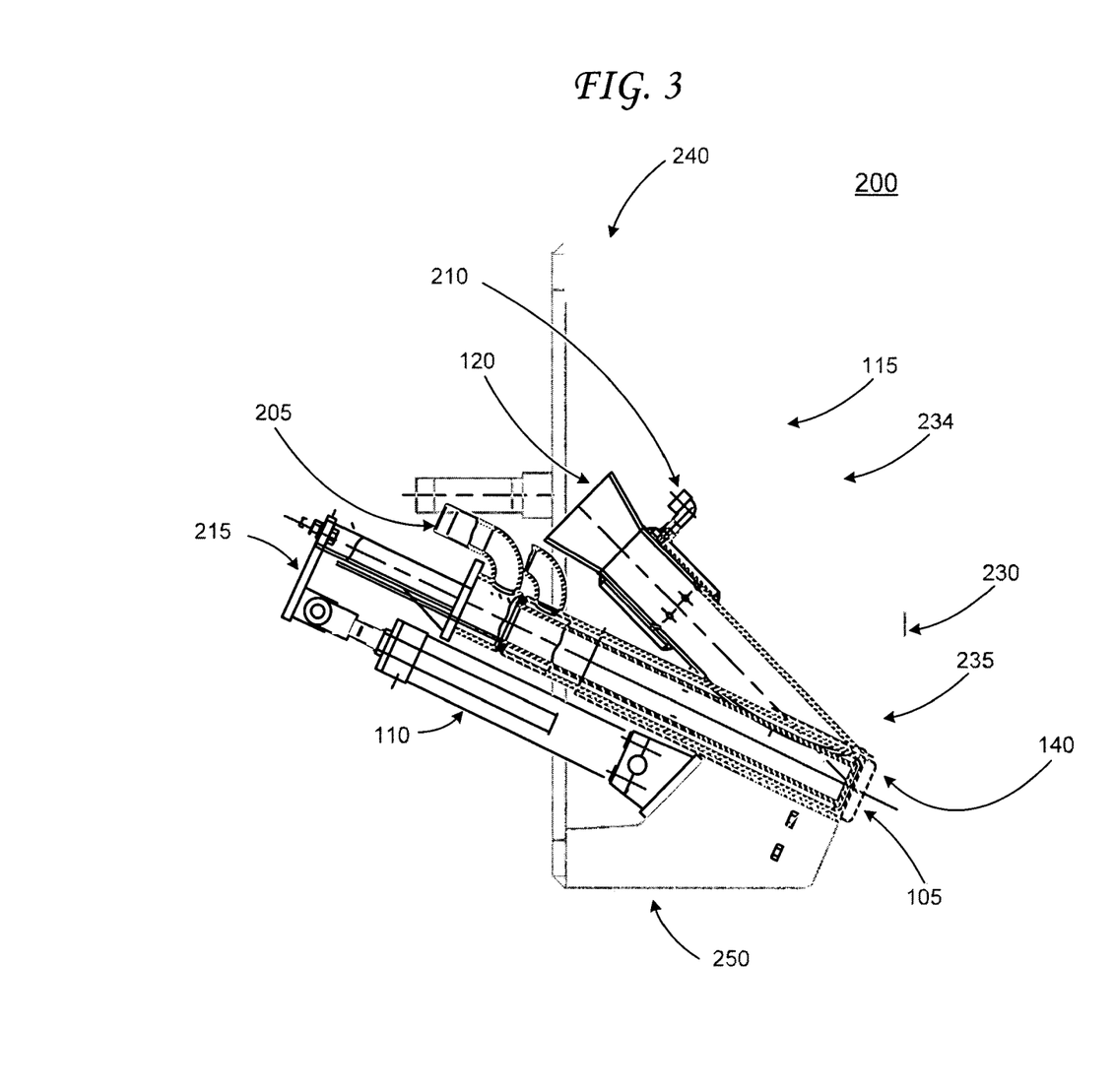
FIG. 3 is a cross-sectioned side view of the furnace probe apparatus illustrated in FIG. 1 showing the furnace probe aperture plug in an inserted position.

Referring now to FIG. 3, which is a cross-sectioned side view of the furnace probe enclosure with the furnace probe aperture plug 105 in its forward position. As shown in FIG. 3, when the furnace probe aperture plug 105 is in its forward (or closed, or inserted) position, the plug 105 fills the furnace probe aperture 140. In this position, the plug 105 prevents slag and other debris from entering the furnace probe apparatus 200. It is typically preferable for the plug 105 to be positioned either flush with the exterior wall of the enclosure 115, or slightly extended through the aperture 140. If the furnace probe aperture plug 105 is positioned within the aperture such that it is slightly retracted, the furnace probe device should still operate correctly. However, it is desirable that the furnace probe aperture plug 105 block the aperture sufficiently so as to minimize slag and debris from exiting the furnace and to minimize ambient air from entering the furnace.

In an exemplary embodiment of the present invention, the furnace probe aperture plug 105 is fluid cooled to protect it from the intense heat of the furnace. Preferably, the side walls and the front face of the plug 105 include fluid channels for cooling the exterior surfaces. Alternatively, the plug may include internal spray nozzles to cool the front face of the plug from the inside. As shown in FIG. 2, fluid can be channeled through the plug 105 using fluid inlet 205 and fluid outlet 206. Those skilled in the art of steel making are familiar with the use of fluid cooling channels to cool furnace components. The use of fluid cooling channels is particularly desirable on the front face of the furnace probe aperture plug 105 because it is exposed to the heat of the furnace throughout most of the melt cycle of the furnace.

In an exemplary embodiment of the present invention, the furnace probe aperture plug 105 is retracted by a furnace probe aperture plug reciprocator 110. Alternatively, another device can be used to retract the furnace probe aperture plug 105 from the furnace probe aperture 140. In another alternative embodiment, the furnace probe aperture plug 105 can be removed or retracted manually.

As illustrated in FIG. 2, the furnace probe aperture plug reciprocator 110 can be a telescoping arm coupled to the furnace probe aperture plug 105. The furnace probe aperture plug reciprocator 110 can be coupled to the furnace probe aperture plug 105 using any suitable coupling devices including, but not limited to, a flange 215 extending between the reciprocator 110 and the plug 105. In an alternative embodiment of the present invention, the telescoping arm may be replaced by an alternative mechanical device capable of exerting a force upon the furnace probe aperture plug 105 to retract and extend the plug 105. In some embodiments, the reciprocator 110 may reciprocate the plug 105 in a linear motion. In still other embodiments, the reciprocator 110 may reciprocate the plug 105 in an arcuate motion.

Preferably, the furnace probe aperture plug reciprocator 110 is controlled electronically. Additionally, the furnace probe aperture plug reciprocator 110 can be controlled automatically at a predetermined time, or can be controlled via an operator interface. The operator interface may be implemented using a switch, lever, software, or other operator interface mechanism. Alternatively, the furnace probe aperture plug reciprocator 110 may be controlled using various devices capable of inserting and retracting the furnace probe aperture plug 105.

In accordance with an exemplary embodiment of the present invention, the furnace probe aperture plug reciprocator 110 may be adapted to move the furnace probe aperture plug 105 through the furnace probe aperture 140 to clear slag from the aperture 140. Additionally, it is typically preferable to extend the furnace probe aperture plug 105 through the furnace probe aperture 140 periodically during a melt cycle to prevent substantial slag build up from clogging the aperture 140, thereby preventing insertion of the probe 125. Throughout a melt cycle, slag is created in the furnace 100 and may build up on any exposed device in the furnace 100.

If significant amounts of slag build up at the furnace probe aperture 140, it may be difficult to remove the slag quickly prior to insertion of the furnace probe 125. The slag can become hard when it adheres to a side wall 160 or to a furnace device, such as the furnace probe apparatus 200. If slag builds up over the furnace probe aperture 140, depending on the level of build up, it may be necessary to clear the slag before inserting the probe 125. Accordingly, it is desirable to avoid significant slag build up. An exemplary method for preventing slag buildup in accordance with the present invention involves reciprocating the furnace probe aperture plug 105 periodically to clear the aperture 140. The reciprocating motion preferably advances the plug 140 through the aperture 140 a sufficient distance to remove the slag and then returns the plug 105 to its position within the aperture 140. Typically, a distance of one to four inches is sufficient to clear the slag. The forward and back reciprocating motion of the plug 105 clears slag from the aperture 140 and prevents large quantities of slag from accumulating and hardening around the aperture 140.

In an exemplary embodiment of the present invention, the plug 105 is reciprocated multiple times during a melt cycle, preferably at least twice. If reciprocating the plug 105 twice during the melt cycle is not sufficient to keep the furnace probe aperture clear, the plug 105 may be reciprocated periodically throughout the melt cycle. An exemplary period for reciprocating the plug 105 is approximately once every five minutes. In furnace operations where slag buildup is extensive, it may be desirable to reciprocate the plug 105 at a more rapid rate.

It is desirable for the furnace probe aperture 140 to be clear of slag when the furnace probe 125 is inserted. Accordingly, it may be desirable to reciprocate the furnace probe aperture plug just prior to insertion of the probe 125 to remove addition slag proximate the furnace probe aperture 140.

In an alternative embodiment of the present invention, slag may be cleared from the furnace probe aperture by retracting the furnace probe aperture plug and injecting a stream of compressed air through the furnace probe aperture 140. The stream of air can blow slag away from the aperture 140. Alternatively, other gases, or liquids, may be in place of the compressed air.

As shown in FIG. 3, the furnace probe mounting enclosure 115 surround encases the furnace probe receptacle 120 and the furnace probe aperture plug 105. The furnace probe mounting enclosure 115 is preferably fluid cooled to protect it from the heat in the furnace. As shown in FIG. 3, fluid cooling channel 205 is provided to direct water, or other cooling fluid, through the furnace probe mounting enclosure 115. In some embodiments, the cooling fluid may be a compressible fluid, a non-compressible fluid, or a combination thereof.

The furnace probe mounting enclosure 115 preferably also includes a sloped porch 234 to direct scrap and debris toward the center of the furnace. Additionally, the sloped porch 234 may include corrugations to trap slag on the surface of the enclosure 115 to help insulate the enclosure 115 from the heat of the furnace.

Figure 4:
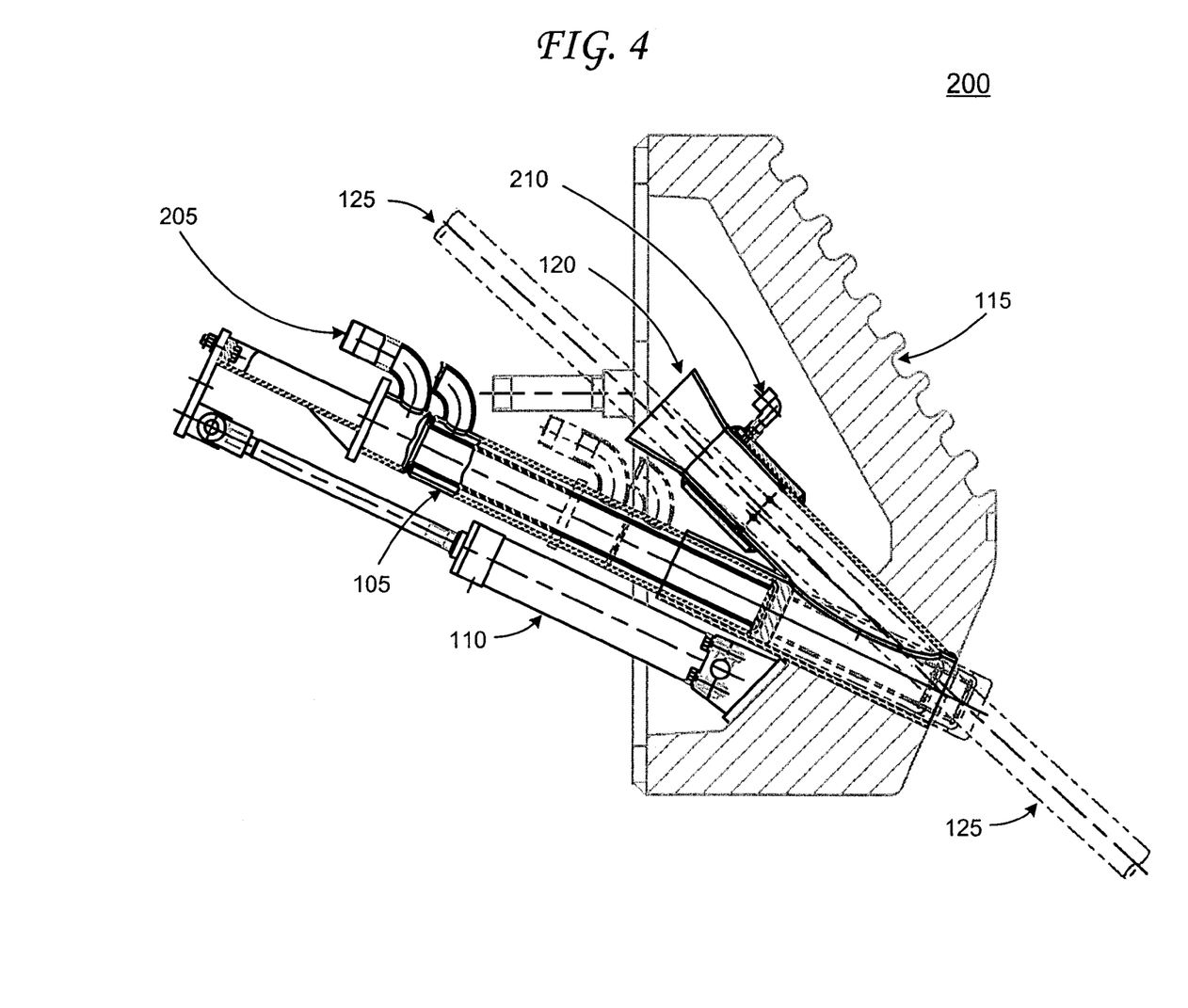
FIG. 4 is a cross-sectioned side view of the furnace probe apparatus illustrated in FIG. 1, which shows the probe aperture plug in both a retracted position and inserted position.

FIG. 4 is a cross-sectioned side view of the furnace probe apparatus showing the probe aperture plug in both a retracted position and an inserted position. The solid lines in FIG. 4 show the furnace probe aperture plug 105 in a retracted position and the dashed lines illustrate the movement of the plug 105 to a closed position and the reciprocating movement of the plug 105. FIG. 4 illustrates the relationship between the furnace probe aperture plug 105 positions in FIGS. 2 and 3.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all applicable equivalents.

I claim:

1. A furnace probe apparatus for use in an electric arc furnace comprising:
    a furnace probe conduit with direct, linear access to the interior of a metal melt furnace, with a first end and a second end, for insertion of a furnace probe into the metal melt furnace;
    a furnace probe plug conduit, with a first end and a second end, disposed at an angle to the furnace probe conduit such that the second end of the furnace probe plug conduit converses with the second end of the furnace probe conduit to form a single furnace probe aperture;
    a furnace probe aperture plug adapted for insertion into the furnace probe aperture in a metal melt furnace;
    a furnace probe aperture plug reciprocator fastened to the furnace probe aperture plug, the reciprocator adapted to reciprocate and remove the furnace probe aperture plug from the furnace probe aperture;
    wherein the furnace probe aperture is adapted to receive a furnace probe when the furnace probe aperture plug is removed from the furnace probe aperture.

2. The apparatus of claim 1, further comprising a furnace probe.

3. The apparatus of claim 1, wherein the furnace probe plug is fluid cooled.

4. The apparatus of claim 3, wherein the fluid is a compressible fluid.

5. The apparatus of claim 3, wherein the fluid is a non compressible fluid.

6. The apparatus of claim 3, wherein the fluid is a combination of compressible and non-compressible fluids.

7. The apparatus of claim 3, wherein the apparatus is located near a zone of chemical energy introduction in the furnace.

8. The apparatus of claim 7, wherein the zone of chemical energy introduction is proximate a carbon injection lance.

9. The apparatus of claim 7, wherein the zone of chemical energy introduction is proximate a burner.

10. The apparatus of claim 7, wherein the zone of chemical energy introduction is proximate an oxygen lance.

11. The apparatus of claim 1, wherein the furnace probe plug reciprocator is further adapted to periodically reciprocate the furnace probe aperture plug during a melt cycle of the electric arc furnace.

12. The apparatus of claim 1, wherein the furnace probe plug reciprocator is further adapted to reciprocate the furnace probe aperture plug at least twice during a melt cycle.

13. The apparatus of claim 1, wherein the furnace probe plug reciprocator is a telescoping arm.

14. The apparatus of claim 1, wherein the furnace probe plug reciprocator is adapted to move the furnace probe plug linearly.

15. The apparatus of claim 1, wherein the furnace probe plug reciprocator is adapted to move the furnace probe plug in an arcuate motion.

16. The apparatus of claim 1, wherein the furnace probe plug reciprocator moves the furnace probe plug automatically.

17. The apparatus of claim 1, wherein the furnace probe plug reciprocator returns the furnace probe plug to substantially the same location from which the furnace probe plug was removed.

18. The apparatus of claim 1, the reciprocator adapted to reciprocate the plug within the aperture.

19. The apparatus of claim 18, the reciprocator extending at least part of the plug within the inside of the furnace.

20. The apparatus of claim 1, the reciprocator coupled to the wall of the furnace.

21. A furnace probe apparatus for use in a furnace having a hearth of refractory material, a plurality of fluid cooled panels forming a side wall, and a refractory step extending a width between the side wall and the hearth, said apparatus comprising:
- a mounting enclosure comprising a first port with direct, linear access to the interior of a metal melt furnace, with a first end and a second end; a second port, with a first end and a second end; and a furnace probe aperture; and adapted for mounting in the furnace;
- a fluid cooled furnace probe plug for insertion into the furnace probe aperture through the second port in the mounting enclosure; and
- a furnace probe plug reciprocator coupled to the mounting enclosure and fastened to the fluid cooled furnace probe plug for reciprocating the fluid cooled furnace probe plug within the furnace probe aperture and to remove the fluid cooled furnace probe plug from the furnace probe aperture;
- a furnace probe plug controller for activating the furnace probe reciprocator to:
    - reciprocate the furnace probe plug one or more times between a position slightly forward of the closed position and a position slightly rearward of the closed position for clearing slag from the furnace probe aperture,
    - move the furnace probe plug to a closed position, in which the furnace probe plug is proximate the furnace probe aperture, and
    - move the furnace probe plug to an open position, in which the furnace probe plug is removed from the furnace probe aperture, and
- wherein the second end of the first port and the second end of the second port merge to form the furnace probe aperture such that the first port and the second port form a v-shaped conduit; and
- wherein the furnace probe aperture is adapted to receive a furnace probe through the first port when the fluid cooled furnace probe plug is removed from the furnace probe aperture.

22. The apparatus of claim 21, further comprising a furnace probe.

23. The apparatus of claim 21, wherein the mounting enclosure extends a width from the side wall approximately equal to the width of the refractory step.

24. The apparatus of claim 21, wherein the mounting enclosure has a rear panel adjacent a side wall of the furnace, the rear panel having a side wall aperture adapted to provide access to the apparatus through the side wall of the furnace.

25. The apparatus of claim 21, further comprising:
- a deflector disposed on the mounting enclosure for deflecting scrap charged in the furnace away from the furnace probe aperture.

26. The apparatus of claim 25, wherein the deflector is a porch sloped toward the inside of the furnace.

27. The apparatus of claim 21, further comprising a slag retainer for retaining slag proximate the mounting device to insulate the mounting device from furnace heat.

28. The apparatus of claim 27, wherein the slag retainer comprises corrugations for retaining slag.

29. The apparatus of claim 21, said mounting enclosure including a front surface facing the interior of the furnace, wherein the front surface is angled downward at a wet angle.

30. The apparatus of claim 29, wherein the wet angle is between five and ten degrees from vertical.

31. The apparatus of claim 21, wherein the furnace probe plug reciprocator is a telescoping arm.

32. A furnace probe apparatus for use in an electric arc furnace having a hearth of refractory material, a plurality of fluid cooled panels forming a side wall with a first side and a second side, and a refractory step extending a width between the second side of the side wall and the hearth, said apparatus comprising:
- a first port with direct, linear access to the interior of metal melt furnace, a first end and a second end, and adapted to receive a furnace probe; and
- a second port with a first end and a second end adapted to receive a furnace probe aperture plug;
- wherein the second end of the first port and the second end of the second port merge to form a common furnace aperture such that the first port and the second port form a v-shaped conduit; and
- wherein at least a portion of the first port, the second port, and the furnace aperture are located between the second side of the side wall and the hearth.

33. The apparatus of claim 32, further comprising a furnace probe aperture plug adapted for insertion into the second port.

34. The apparatus of claim 33, further comprising a furnace probe aperture plug reciprocator coupled to the furnace probe aperture plug and adapted to remove the furnace probe aperture plug from the furnace aperture.

* * * * *